(12) United States Patent
Kirby et al.

(10) Patent No.: US 11,581,840 B2
(45) Date of Patent: Feb. 14, 2023

(54) FLEXIBLE FAULT DETECTION

(71) Applicant: Skyworks Solutions, Inc., Irvine, CA (US)

(72) Inventors: Asa Shea Kirby, Austin, TX (US); John Nathaniel Wilson, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 347 days.

(21) Appl. No.: 16/833,871

(22) Filed: Mar. 30, 2020

(65) Prior Publication Data
US 2021/0305927 A1    Sep. 30, 2021

(51) Int. Cl.
| H02P 27/06 | (2006.01) |
| H02H 7/08 | (2006.01) |
| H02P 29/024 | (2016.01) |
| H02K 11/20 | (2016.01) |

(52) U.S. Cl.
CPC ........... *H02P 27/06* (2013.01); *H02H 7/0822* (2013.01); *H02K 11/20* (2016.01); *H02P 29/0241* (2016.02)

(58) Field of Classification Search
CPC ..... H02P 27/06; H02P 29/0241; H02K 11/20; H02H 7/0822
See application file for complete search history.

(56) References Cited

U.S. PATENT DOCUMENTS

| 6,097,582 | A | 8/2000 | John et al. |
| 8,213,192 | B2 | 7/2012 | Konecny et al. |
| 9,166,499 | B2 | 10/2015 | Suzuki |
| 9,698,654 | B2 | 7/2017 | Santos et al. |
| 10,511,291 | B1 * | 12/2019 | Kandah ................ H03K 17/567 |
| 10,917,081 | B1 * | 2/2021 | Nguyen ................ H03K 17/18 |
| 2004/0136135 | A1 | 7/2004 | Takahashi |
| 2004/0251951 | A1 | 12/2004 | Beck |
| 2008/0106319 | A1 | 5/2008 | Bayerer |
| 2008/0315925 | A1 | 12/2008 | Alfano |

(Continued)

OTHER PUBLICATIONS

Infineon, "EiceDRIVER™ Safe High Voltage Gate Driver IC with Reinforced Isolation," AN2014-03, Revision 1.2, Jul. 6, 2018, 25 pages.

(Continued)

*Primary Examiner* — Scott Bauer
(74) *Attorney, Agent, or Firm* — Knobbe, Martens, Olson & Bear, LLP

(57) ABSTRACT

A system for controlling a high-power drive device includes a fault detection integrated circuit product configured to provide an indication of a fault condition associated with the high-power drive device to a first terminal in a first voltage domain in response to detecting the fault condition in a second voltage domain. The system includes a gate driver controller integrated circuit product configured to drive a second terminal coupled to a control node in a second voltage domain based on a control signal and an enable signal received from a third terminal in the first voltage domain. The second voltage domain is higher than the first voltage domain. The system may include a redundant fault reporting integrated circuit product or an additional fault detection integrated circuit product configured to detect a second fault condition in the second voltage domain that is different from the fault condition.

19 Claims, 6 Drawing Sheets

(56) References Cited

U.S. PATENT DOCUMENTS

| | | | |
|---|---|---|---|
| 2009/0021294 | A1 | 1/2009 | Morishita |
| 2011/0050198 | A1 | 3/2011 | Dong et al. |
| 2011/0157919 | A1 | 6/2011 | Yedevelly et al. |
| 2011/0157941 | A1 | 6/2011 | Yedevelly et al. |
| 2012/0161841 | A1 | 6/2012 | Dong et al. |
| 2013/0242438 | A1 | 9/2013 | Fukuta |
| 2015/0015309 | A1 | 1/2015 | Werber |
| 2015/0070078 | A1 | 3/2015 | Jeong et al. |
| 2015/0085403 | A1 | 3/2015 | Santos et al. |
| 2020/0076416 | A1* | 3/2020 | Bang .................. H03K 17/0822 |
| 2020/0076425 | A1* | 3/2020 | Garg .................. H03K 17/0822 |

OTHER PUBLICATIONS

Silicon Labs, "Si8285/86 Data Sheet," downloaded from Silabs.com, Revision 1.0, Feb. 13, 2020, 33 pages.

Analog Devices, Inc., "Isolated Half-Bridge Gate Driver with Integrated Isolated High-Side Supply," ADuM6132, 2008-2012, 16 pages.

Analog Devices, Inc., "Isolated Half-Bridge Driver with Integrated High-Side Supply," ADuM5230, 2008-2013, 16 pages.

Agilent Technologies, "2.0 Amp Gate Drive Optocoupler with Integrated (VCE) Desaturation Detection and Fault Status Feedback," HCPL-316J, Mar. 1, 2005, 33 pages.

Agago Technologies, "Active Miller Clamp Products with Feature: ACPL-331J, ACPL-332J," Application Note 5314, Jul. 21, 2010, 6 pages.

Avago Technologies, "Dual-Output Gate Drive Optocoupler Interface with Integrated (VCE) DESAT Detection, FAULT and UVLO Status Feedback," ACPL-339J, Jan. 31, 2013, 23 pages.

Avago Technologies, "Desaturation Fault Detection Optocoupler Gate Drive Products with Feature: ACPL-333J, ACPL-330J, ACPL-332J, ACPL-331J, and HCPL-316J," Application Note 5324, Jan. 9, 2012, 7 pages.

Texas Instruments, "Precision Lowest-Cost Isolation Amplifier," ISO124, Sep. 1997—Revised Sep. 2005, 17 pages.

Texas Instruments, "Fully-Differential Isolation Amplifier," AMC1200 AMC1200B, Apr. 2011—Revised Aug. 2012, 24 pages.

Silicon Labs, "Isolated Amplifier for Current Shunt Measurement," Si8921/22 Data Sheet, Rev. 0.5, Mar. 2019, 30 pages.

Skyworks, "AN1270: Estimating Total Static Error for Skyworks Si89xx Isolated Amplifiers and Delta-Sigma Modulators," Rev. 0.1, Dec. 10, 2021, 14 pages.

* cited by examiner

FLEXIBLE FAULT DETECTION

BACKGROUND

Field of the Invention

The present application is related to circuits and more particularly to control circuits for high-power applications.

Description of the Related Art

In a typical control application, a processor system provides one or more control signals for controlling a load system. During normal operation, a large DC or transient voltage difference may exist between a domain of the processor system and a domain of the load system, thus requiring an isolation barrier between the processor system and the load system. For example, one domain may be "grounded" at a voltage that is switching with respect to earth ground by hundreds or thousands of volts. Accordingly, an intermediate system includes isolation that prevents damaging currents from flowing between the processor system and the load system. Although the isolation prevents the processor system from being coupled to the load system by a direct conduction path, an isolation communications channel allows communication between the two systems using optical (opto-isolators), capacitive, inductive (transformers), or electromagnetic techniques. In at least one embodiment, the isolation communications channel blocks DC signals and only passes AC signals. The intermediate system typically uses a voltage converter and output driver to provide the control signal at voltage levels suitable for the load system.

Referring to FIG. 1, in an exemplary AC motor control application, processor 100, which may be a microprocessor, microcontroller, or other suitable processing integrated circuit product, operates in a first voltage domain (i.e., VDD1, e.g., 3.3-5 Volts (V)) and provides one or more signals for a high power load system operating in a second voltage domain (i.e., VDD3, e.g., 600V). Systems 102 each include an isolation barrier 130 and an isolation communications channel for safely communicating control signals from processor 100 to drivers 106, which drive high-power drive devices 108 and 109 of a three-phase AC inverter used to deliver three-phase power to AC motor 120. Exemplary high-power drive devices include power metal-oxide-semiconductor field-effect transistors (MOSFETs), insulated-gate bipolar transistors (IGBTs), Gallium-Nitride (GaN) MOSFETs, Silicon-Carbide power MOSFETs, or other suitable devices able to deliver high currents over short periods of time.

Voltage converters 104 convert an available power supply voltage from VDD3 to a voltage level (i.e., VDD2, e.g., approximately 5-25 V) usable by a high side of systems 102 and drivers 106. Note that in other embodiments, a single voltage converter 104 converts one power supply voltage from a first voltage level (e.g., VDD3) to multiple other voltage levels (e.g., VDD1 and VDD2) and/or provides multiple outputs of a particular voltage (e.g., multiple VDD2 outputs corresponding to multiple systems 102). Drivers 106 provide switch control signals at levels required by corresponding high-power drive devices 108 or 109 of the three-phase AC inverter. The load motor requires three-phase power at high power levels. Systems 102 that correspond to high-power devices coupled to VDD3 (high-side inverter devices), are "grounded" at a voltage that is switching with respect to earth ground by the high voltage levels of VDD3. Typical high-power drive devices 108 and 109 of the three-phase inverter that are used to drive AC motor 120 require substantial turn-on voltages (e.g., voltages in the range of tens of Volts) and are susceptible to fault conditions that may damage those devices. Accordingly, flexible techniques for handling fault conditions without damaging high-power drive devices or the load that those devices control are desired.

SUMMARY OF EMBODIMENTS OF THE INVENTION

In at least one embodiment of the invention, a system for controlling a high-power drive device includes a fault detection integrated circuit product configured to provide an indication of a fault condition associated with the high-power drive device to a first terminal in a first voltage domain in response to detecting the fault condition in a second voltage domain. The system includes a gate driver controller integrated circuit product configured to drive a second terminal coupled to a control node in the second voltage domain based on a control signal and an enable signal received from a third terminal in the first voltage domain. The second voltage domain is higher than the first voltage domain. The system may include a redundant fault reporting integrated circuit product configured to detect the fault condition in the second voltage domain and to provide a redundant indication of the fault condition to a redundant terminal in the first voltage domain. The system may include an additional fault detection integrated circuit product configured to detect a second fault condition in the second voltage domain and to provide a second indication of the second fault condition to an additional terminal in the first voltage domain. The second fault condition may be different from the fault condition.

In at least one embodiment of the invention, a method includes driving a high-power drive device using a communications channel across a first isolation barrier between a first voltage domain and a second voltage domain of a gate driver controller integrated circuit product. The method includes detecting a fault in a configuration of the high-power drive device by a fault detection integrated circuit product. The method includes reporting the fault using a feedback communications channel across a second isolation barrier between the first voltage domain and the second voltage domain. Reporting the fault may include reporting the fault to a controller integrated circuit product by the fault detection integrated circuit product simultaneously with reporting the fault to the gate driver controller integrated circuit product. The method may include redundantly detecting the fault in the second voltage domain and providing a redundant indication of the fault to a redundant terminal in the first voltage domain. The method may include receiving, by a controller integrated circuit product, fault information from the fault detection integrated circuit product. The method may include providing, by the controller integrated circuit product, a control signal based on the fault information to the gate driver controller integrated circuit product.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 2:
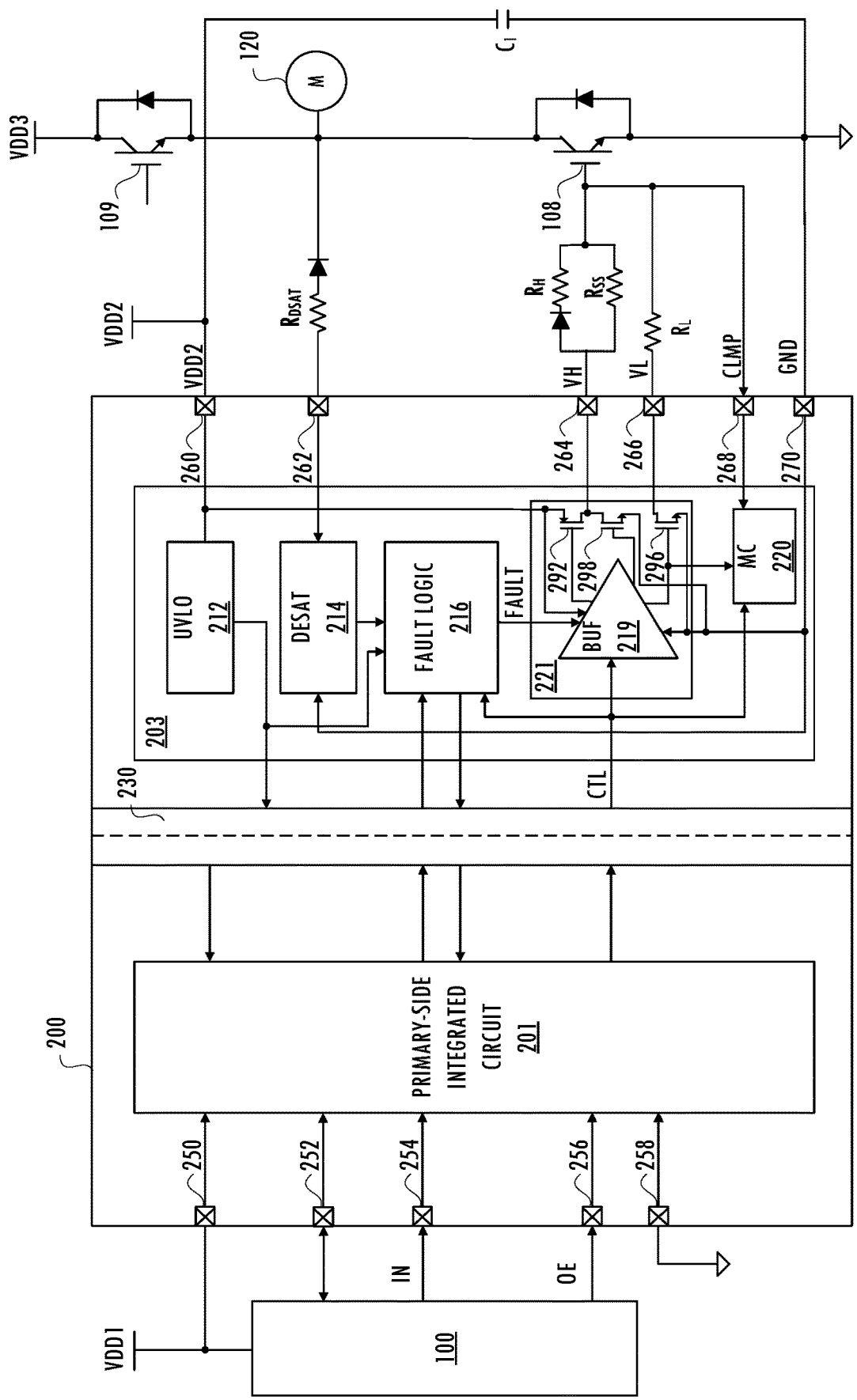
FIG. 2 illustrates a functional block diagram of a portion of the exemplary motor control system of FIG. 1 including fault detection circuitry and driver control circuits.

Referring to FIG. 2, in an exemplary AC motor control application, processor 100 operates in a first voltage domain (i.e., VDD1, e.g., 5V) and provides one or more signals for a high power load system operating in a second voltage domain (i.e., VDD3, e.g., hundreds of volts). Driver product 200 includes isolation barrier 230 and a communications channel for safely communicating control signals from processor 100 across isolation barrier 230 to drive high-power drive devices 108 and 109 of a three-phase inverter used to deliver three-phase power to AC motor 120. In an exemplary embodiment, driver product 200 includes multiple integrated circuits configured as a multi-chip module in a single package. For example, driver product 200 includes primary-side integrated circuit 201 and secondary-side integrated circuit 203. Primary-side integrated circuit 201 receives a control signal from processor 100 and communicates the signal across isolation barrier 230 to secondary-side integrated circuit 203. In such embodiments, terminals 250, 252, 254, . . . , and 270 are pins of a package of the multi-chip module and are coupled to external elements, e.g., discrete resistors and capacitors, and to processor 100.

Driver product 200 includes isolation barrier 230, which isolates the voltage domains on a first side (e.g., primary-side integrated circuit 201) of driver product 200, which operates using VDD1 (e.g., a voltage less than ten volts), and a second side (e.g., secondary-side integrated circuit 203) of driver product 200, which operates using VDD2 (e.g., a voltage of tens of volts). An isolation communications channel facilitates communication between primary-side integrated circuit 201 and secondary-side integrated circuit 203. Any suitable communications technique that does not use a conductive path between the two sides may be used, e.g., optical, capacitive, inductive, or electromagnetic techniques. The isolation communications channel facilitates communication of a control signal to secondary-side integrated circuit 203 from processor 100 via primary-side integrated circuit 201.

An exemplary isolation communications channel uses digital modulation (e.g., on-off keying modulation) to communicate one or more digital signals between primary-side integrated circuit 201 and secondary-side integrated circuit 203, although other communication protocols may be used. In general, on-off keying modulation is a form of amplitude-shift keying modulation that represents digital data as the presence or absence of a carrier wave or oscillating signal having a carrier frequency $f_c$ (e.g., 500 MHz-1 GHz). The presence of the carrier for a specified duration represents a binary one, while its absence for the same duration represents a binary zero. This type of signaling is robust for isolation applications because a logic '0' state sends the same signal (e.g., nothing) as when the primary side loses power and the device gracefully assumes its default state. That behavior is advantageous in driver applications because it will not accidentally turn on a load device being driven, even when the primary side loses power. However, the isolation communications channel may use other types of signals (e.g., pulse width modulated signals or other types of amplitude-shift keying modulated signals). The digital modulation scheme used may be determined according to performance specifications (e.g., signal resolution) and environment (e.g., probability of transient events) of the target application.

Secondary-side integrated circuit 203 includes driver 221, which generates one or more output control signals based on received control signal CTL received from primary-side integrated circuit 201, which generates the output control signal based on the control signal received from processor 100 via terminal 254. Driver 221 provides corresponding signals to terminals 264 and 266. Buffer 219 generates control signals at appropriate signal levels for controlling pull-up and pull-down devices of driver 221, respectively. Buffer 219 may generate one control signal or two separate control signals for the pull-up device 292 and the pull-down device 296 based on received control signal CTL. Resistor $R_H$ adjusts the pull-up strength by $1/R_H$ independently from resistor $R_L$ that adjusts the pull-down strength by $1/R_L$. Although received control signal CTL is illustrated as a single-ended signal based on input control signal CTL received from processor 100 on terminal 254, note that in other embodiments, input control signal IN and received control signal CTL are differential signals. In general, signals illustrated herein as single-ended signals may be implemented as differential signals in other embodiments and signals illustrated herein as differential signals may be implemented as single-ended signals in other embodiments.

The pull-up strength and the pull-down strength of the output control signal provided to the control terminal of high-power drive device 108 can be independently adjusted from on-resistance $R_{DS(ON)}$ of pull-up device 292 coupled to terminal 264 using one or more passive elements. For example, resistor $R_H$ adjusts the pull-up strength. Resistor $R_L$ adjusts the pull-down strength of the signal provided to the gate of high-power drive device 108 via terminal 266 to have a strength that is the same as, or different from, the pull-up strength of the signal provided to the gate of high-power drive device 108. In a typical configuration, pull-up time tr is slower than the pull-down time tfl and resistances of resistors $R_H$ and $R_L$ vary with specifications for embodiments of high-power drive device 108 (e.g., power MOSFET, IGBT, GaN MOSFET, Si-Carbide power MOSFET, etc.).

In at least one embodiment, primary-side integrated circuit 201 provides detailed information from the high-power drive device side to the voltage domain of the controller (e.g., voltage level measurements, temperature measurements, or other information that may be used to notify a user of a type or a severity of a fault). In at least one embodiment, the isolation communications channel feeds back voltage information or fault information from secondary-side integrated circuit 203 to primary-side integrated circuit 201. Primary-side integrated circuit 201 or processor 100 uses that information to adjust operating parameters or generate one or more fault indicators that may be used for automatically handling faults by controlling output driver 221 accordingly. For example, secondary-side integrated circuit 203 includes modules (e.g., desaturation detector 214) that detect fault conditions associated with high-power drive devices. Fault indicator(s) may be used by secondary-side integrated circuit 203 to prevent damage to the high-power drive devices, load system, or user of the load system. In addition, secondary-side integrated circuit 203 may send an indication of a fault or associated diagnostic information to primary-side integrated circuit 201 and/or processor 100.

Figure 1:
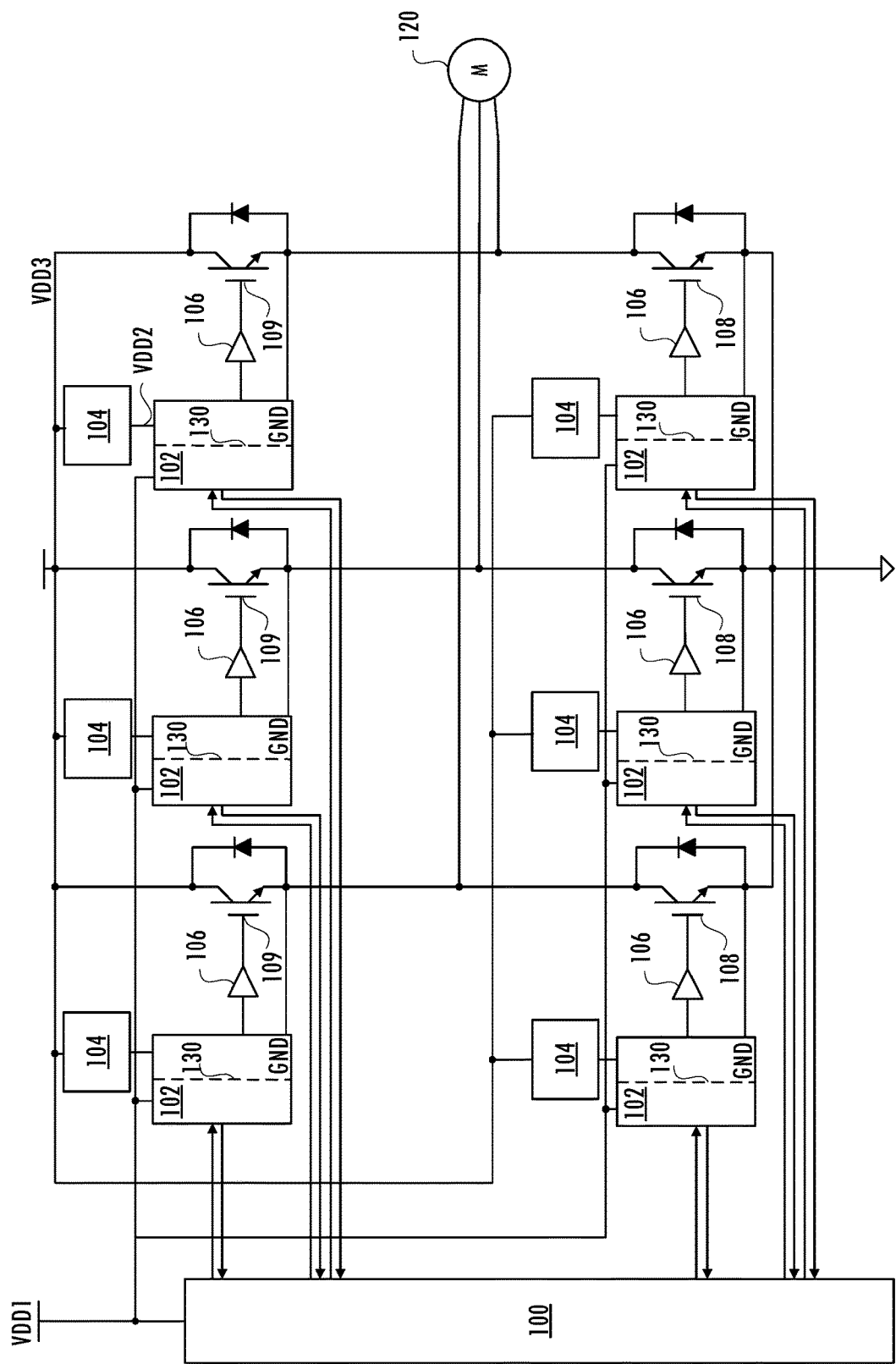
FIG. 1 illustrates a functional block diagram of an exemplary motor control system.

In at least one embodiment, secondary-side integrated circuit 203 includes desaturation fault protection for high-power semiconductor devices, which protects against short-circuit current events that may destroy high-power drive device 108. This fault may result from an insufficient gate drive signal caused by inverter gate driver misbehavior, drive supply voltage issues, a short circuit in a power stage, or other excessive current or power dissipation of the high-power drive devices. Those events can substantially increase power consumption that quickly overheats and damages the corresponding high-power drive device. For example, when a short circuit current condition occurs in the exemplary AC motor drive application of FIGS. 1 and 2 (i.e., both devices of an individual inverter are on), high current flows through high-power drive devices 108 and 109 and may destroy high-power drive devices 108 and 109. Accordingly, a fault detection technique detects this desaturation condition. Driver product 200 may send an indicator thereof to processor 100, and driver product 200 or processor 100 may trigger a shut-down of a corresponding high-power drive device.

Desaturation fault protection reduces or turns-off over currents during the fault condition. In a typical application, terminal 262 is coupled to an external resistor and diode that are coupled to a terminal of high-power drive device 108 (e.g., the collector terminal of an IGBT or drain terminal of a MOSFET). Desaturation detection circuit 214 senses when the collector-emitter voltage (or drain-source voltage, as the case may be) of high-power drive device 108 exceeds a predetermined threshold level (e.g., 7 V). Note that the predetermined threshold level of desaturation detection circuit 214 may be externally adjusted based on the forward voltage of one or more diodes coupled to the desaturation resistor coupled to terminal 262 or based on the resistance of the desaturation resistor $R_{DSAT}$. In addition, a delay time may be introduced by coupling a capacitor (not shown) between terminal 262 and an external power supply node.

In general, undervoltage lockout detector 212 prevents application of insufficient voltage to the control terminal of high-power drive device 108 by forcing the output on terminal 264 to have a low voltage during power-up of driver product 200. Undervoltage lockout detector 212 detects when the power supply voltage (e.g., VDD2 sensed using terminal 260) exceeds a first predetermined undervoltage lockout threshold voltage and generates an indication thereof, which may be used to disable the lockout condition. Undervoltage lockout detector 212 also detects when the power supply voltage falls below a second predetermined undervoltage lockout threshold, which may be different from the first undervoltage lockout threshold voltage, to provide noise margin for the undervoltage lockout voltage detection. The indicator generated by undervoltage lockout detector 212 may be provided to processor 100 using terminal 252.

In general, a gate voltage spike is created when turning on another high-power drive device coupled to high-power drive device 108. For example, when turning on high-power drive device 109, high-power drive device 108 experiences a voltage change $dV_{CE}/dt$ causing current flow into the gate drive terminal coupled to lower high-power drive device 108 and charges the collector-to-gate parasitic capacitor of an IGBT device. The collector-to-gate parasitic capacitor of an IGBT device (or the drain-to-gate parasitic capacitor of a MOSFET in other embodiments of high-power device 108) is referred to as the Miller capacitor. That gate-collector coupling (or gate-drain coupling, as the case may be) can cause a parasitic turn on of device 108 in response to a high transient voltage (e.g., a gate voltage spike) generated while high-power drive device 108 is turned off. Miller clamp 220 reduces effects of any parasitic turn-on of high-power drive device 108 due to charging of the Miller capacitor. Miller clamp 220 senses that current using terminal 268, which is coupled to the gate of high-power drive device 108. That current creates a voltage drop across any gate resistance and increases the gate-emitter voltage of a corresponding lower high-power drive device. If the gate-emitter voltage exceeds the device threshold voltage (e.g., 2 V), then high-power drive device 108 turns on. A similar parasitic turn-on event occurs when turning on high-power drive device 108 and the corresponding high-power drive device 109 is in an off state. Miller clamp 220 couples terminal 268 to ground via a low-resistance switch that hinders or prevents the Miller capacitor current from developing a voltage sufficient to turn on high-power drive device 108. In some embodiments of driver product 200, Miller clamp 220 is not needed because a sufficiently sized gate capacitor coupled between the gate and emitter of each high-power drive device 108 shunts any Miller current and raises the level of the transient needed to parasitically turn on the device. However, such embodiments increase the gate charge voltage required to reach the threshold voltage of high-power drive device 108, increase the driver power, and increase switching losses of high-power drive device 108. In other embodiments of driver product 200, secondary-side integrated circuit 203 is referred to a negative voltage rather than ground by coupling terminal 270 to a negative power supply (e.g., −5 V). This configuration provides additional voltage margin to increase the likelihood that the parasitic turn-on transient does not raise the control terminal of high-power drive device 108 above its threshold voltage. However, this configuration may require an additional cost for generating the negative voltage.

Upon detection of a fault condition by modules on secondary-side integrated circuit 203, fault logic 216 generates control signal FAULT, which may initiate shutdown of high-power drive device 108. Fault logic 216 reports the fault condition to processor 100 via primary-side integrated circuit 201. Alternatively, fault logic 216 only reports the fault condition to primary-side integrated circuit 201 and high-power drive device 108 continues operation. Then, primary-side integrated circuit 201 reports the fault condition to processor 100. Since a system may include multiple high-power drive devices (e.g., six high-power drive devices in the exemplary AC motor control application described herein), shutting down only one of these devices may harm the high-power drive devices or the load. Therefore, in response to detection of a fault, processor 100 may initiate a shutdown of high-power drive device 108 only after detecting a predetermined number of faults over a particular period of time or other condition is satisfied. In at least one embodiment, processor 100 initiates shutdown of high-power drive device 108 independently from any fault detection of driver product 200 (e.g., based on fault detection from another driver product 200 associated with another high-power drive device 108 or 109).

An abrupt shutoff of high-power drive device 108 may result in large di/dt induced voltages. Such voltage spikes could be damaging to the high-power drive circuit or the load. Accordingly, in response to a fault condition, processor 100 or driver product 200 initiates a soft shutdown of high-power drive device 108 using device 298 that slowly discharges the control node coupled to the gate terminal of high-power drive device 108 at a rate having a fall time that is longer than the regular fall time of the output control signal. For example, fault logic 216 receives indicators from undervoltage lockout detector 212 and desaturation detection circuit 214 and generates control signal FAULT based thereon to initiate a soft shutdown.

In an embodiment of gate drive circuit 200 that includes a terminal coupled to pull-up device 292 and a pin coupled to the pull-down device 296, soft shut-down is implemented by coupling pull-down device 298, which is a smaller switch than pull-down device 296, to pull-up device 292. Accordingly, the signal provided to the high-power drive device has a pull-up strength that is based on $1/(R_H \| R_{SS})$, a pull-down strength based on $1/R_L$, and a soft shutdown pull-down strength based on $$\frac{1}{R_{TOT}} = \frac{1}{(R_{SS}) + R_{SW298}}.$$

In general, the pull-up or pull-down speed is linearly related to $$\frac{1}{R_{TOT}}.$$

In this embodiment of driver product 200, soft shutdown impedance $R_{SS}$ may be excluded in applications where the strength of pull-down device 298 provides sufficiently low soft shutdown pull-down strength. In addition, the diode may be excluded. Although soft shutdown impedance $R_{SS}$ affects both the rise time and the soft shutdown time of the control signal, the configuration of the three external resistors and the two terminals provides three degrees of freedom for programming the rise time, fall time, and soft shutdown fall time of the control signal provided to the gate of high-power drive device 108. Accordingly, the soft shutdown fall time of the control signal can be adjusted independently from the regular fall time and independently from the rise time. In at least one embodiment, a diode is coupled between terminal 264 and resistor $R_H$. Note that in other embodiments, terminals 264 and 266, pull-up device 292, pull-down devices 296 and 298, and passive elements between high-power drive device 108 and terminals 264 and 266 implement different configurations of rise-time, fall-time, and soft shutdown fall time. For example, terminal 264, pull-up device 292, pull-down device 298, and passive elements coupled between terminal 264 and high-power drive device 108 may be configured to implement the rise time and fall time of the control signal in the absence of a fault condition and terminal 266, pull-down device 296, and passive elements coupled between terminal 266 and high-power drive device 108 may be configured to implement the soft shutdown fall time. In such embodiments, the soft shutdown fall time of the control signal can be adjusted independently from the regular fall time and to have a strength different from the strength of the rise time.

Figure 3A:
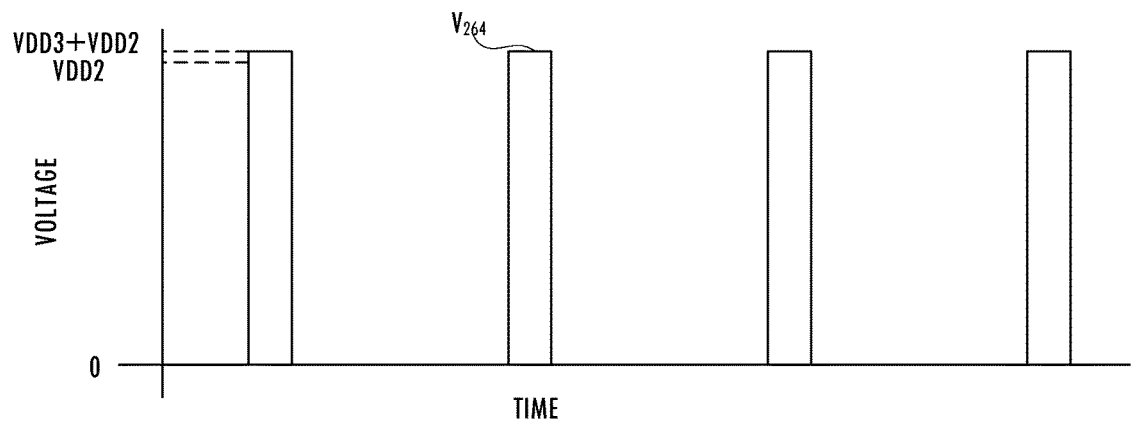
FIGS. 3A-3C illustrate voltage waveforms of a switching node of the motor control system of FIG. 2.
Figure 3B:
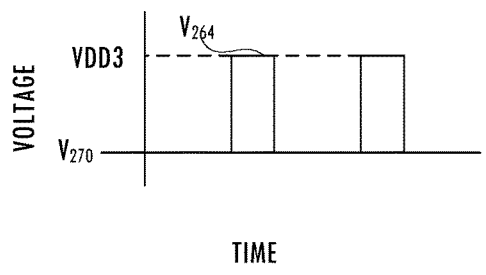
Figure 3C:
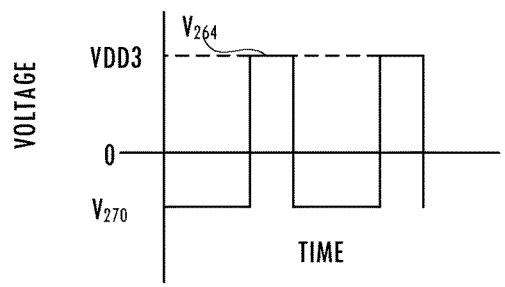

Exemplary waveforms of the voltages associated with high-power drive device 108 for a three-phase power application are illustrated in FIGS. 3A-3C. FIG. 3A illustrates the switching voltage on terminal 264 when driver product 200 drives the high-side switch of an inverter (e.g., high-power device 109) and terminal 270 is coupled to node 300, i.e., driver product 200 is "grounded" at a voltage that is switching with respect to earth ground by VDD2 (e.g., hundreds or thousands of volts). FIG. 3B illustrates the voltage on terminal 264, as generated by driver product 200 when driving the corresponding low-side switch of the inverter (e.g., high-power device 108) and terminal 270 is coupled to earth ground. FIG. 3C illustrates the voltage on terminal 264, as generated by driver product 200 when driving the low-side switch of the inverter (e.g., high-power device 108) and terminal 270 is coupled to −VSS2.

Figure 4:
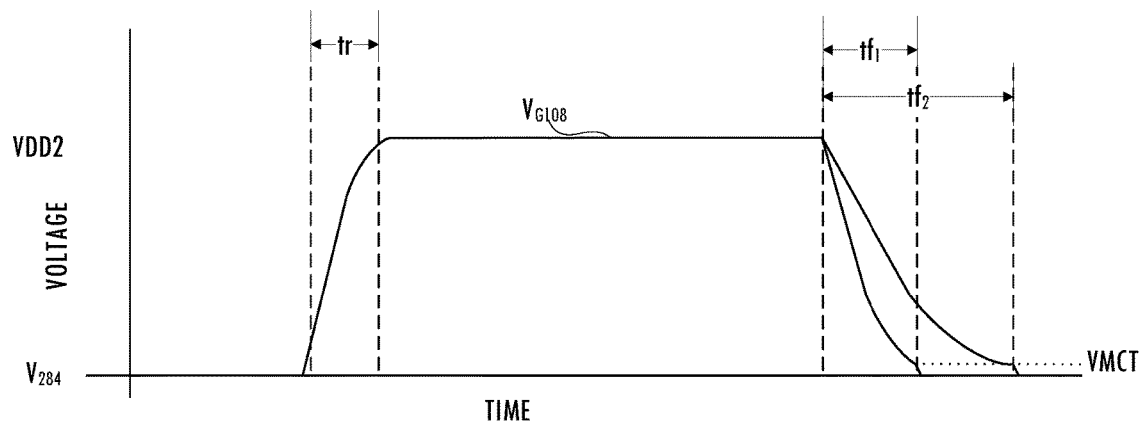
FIG. 4 illustrates details of the exemplary control signal of the gate drive circuit of FIG. 2 consistent with at least one embodiment of the invention.

An exemplary waveform of the voltage provided to the control terminal of high-power drive device 108 is illustrated in FIG. 4. In the absence of a fault condition, the voltage on the gate of high-power drive device 108 has a rise time of tr and a fall time of $tf_1$. The soft shutdown fall time of terminal 264 is $tf_2$ (e.g., where $tf_2 > tf_1$) when pull-down device 298 is enabled. At Miller clamp threshold voltage VMCT (e.g., VSSB+2 V), Miller clamp 220 couples terminal 268 to ground via a low-resistance switch that hinders or prevents the Miller capacitor current from developing a voltage sufficient to turn on the high-power drive device.

In general, a gate driver integrated circuit product undergoes substantial testing before being qualified for use in an exemplary application (e.g., Automotive Safety Integrity Level (ASIL) applications). Testing and qualification is costly and may delay delivery to market of any new or revised gate driver integrated circuit products. Unlike driver product 200, other existing driver products that have been previously qualified for a target application may not include a feedback communications channel (e.g., a safety-oriented feedback channel) for sending fault information from the secondary side (e.g., high-voltage gate driver side) to the primary side (e.g., controller side) across the isolation barrier. Therefore, those existing products are unusable for some applications and are unable to take advantage of some advances in high-power drive devices. An exemplary automotive application requires a redundant channel that is separate from a gate driver product or requires additional fault detection and reporting capabilities to improve safety or reliability of a target system. Thus, a high-power gate driver solution providing flexibility for including fault detection and reporting can improve reliability, can improve time-to-market, and can provide new safety features as compared to a conventional product that integrates a gate driver and with fault detection and fault reporting.

A fault detection integrated circuit product including fault detection circuitry, fault reporting circuitry, and a feedback communications channel across an isolation barrier therebetween allows a user to add fault reporting and fault notification capability to prior qualified gate driver products, which may be selected from a variety of gate drivers offered by any vendor at a competitive price. The fault detection integrated circuit product includes configurable fault detection for various types of high-power drive devices and provides for a communications channel of the gate driver integrated circuit product being shut down separately from a feedback communications channel in response to a fault condition. The fault detection integrated circuit product detects and reports at least one fault condition, such as: low driver supply voltage (i.e., Under Voltage Lock Out (UVLO)), over current in a high-power drive device (i.e., Over Current Detection (OCD)), sensing of desaturation of the high-power drive device (i.e., desaturation detection (DSAT)), as described above, overtemperature in the high-power drive device (e.g., implemented by sensing an external thermistor, not shown), overvoltage of VDD2, measurement system overvoltage, overvoltage or undervoltage of VDD3, gate drive voltage of high-power drive devices out of a target range, or other fault conditions associated with the high-power drive device.

In at least one embodiment, the fault detection integrated circuit product provides over current and desaturation fault detection and reporting in a single fault detection integrated circuit product. In other embodiments, a first fault detection integrated circuit product provides over current fault detection and reporting and a second fault detection integrated circuit product provides desaturation fault detection. In at least one embodiment, one or more fault detection integrated circuit product remains operational even when a gate driver controller integrated circuit product fails. Thus, a controller integrated circuit product receives an indication of the failure and can handle that failure accordingly. In at least one embodiment, a fault detection integrated circuit is programmable to monitor a selectable type of high-power drive device (e.g., an insulated-gate bipolar transistor, a Silicon-Carbide power MOSFET, or Gallium-Nitride MOSFET) according to a voltage measured using a Thevenin pin or other technique for providing configuration information to the fault detection integrated circuit product.

Figure 5:
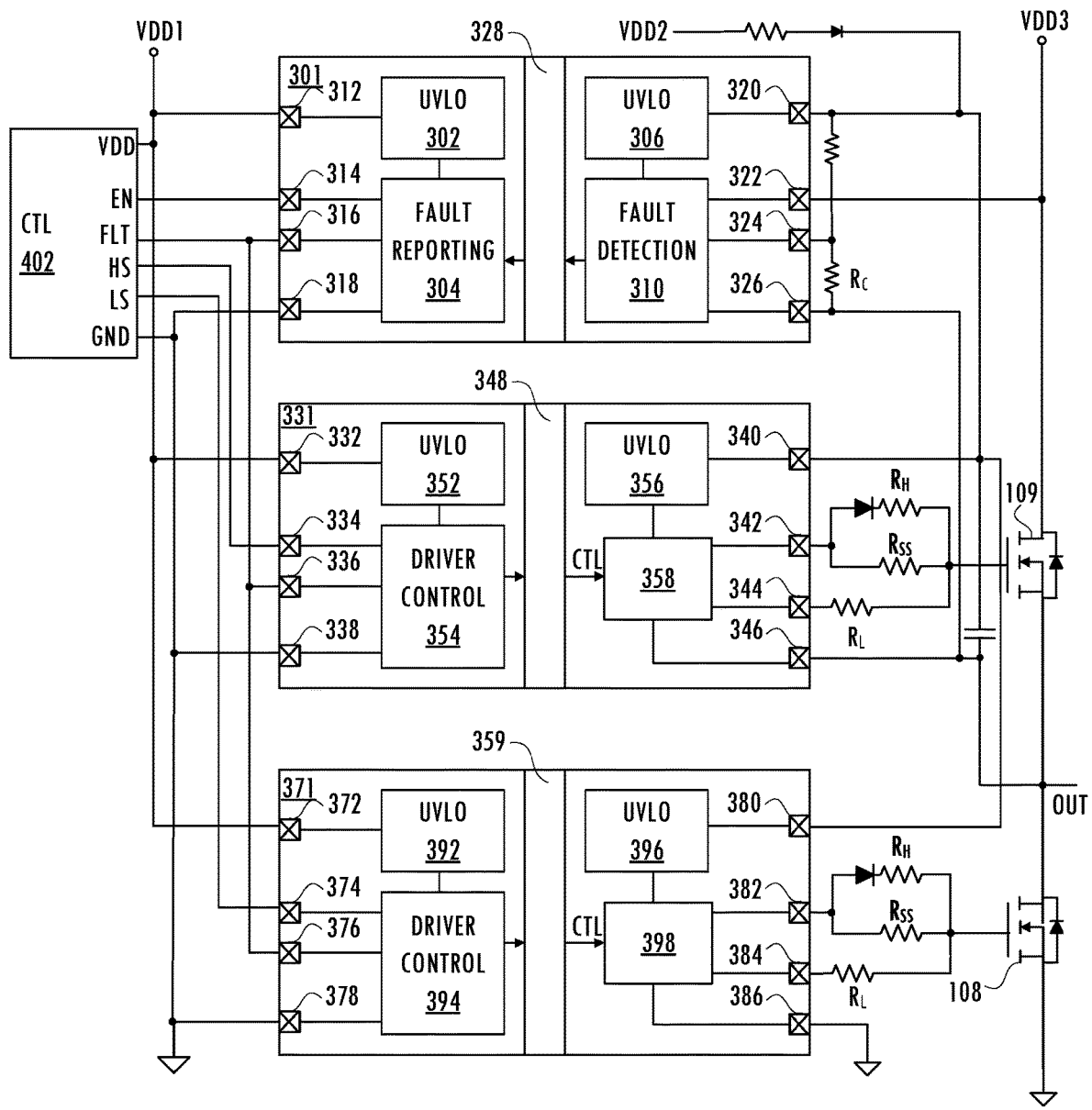
FIG. 5 illustrates a functional block diagram of a control system for driving high-power drive devices including a fault detection integrated circuit product and separate gate drive devices consistent with at least one embodiment of the invention.

Referring to FIG. 5, in at least one embodiment of a gate driver application, gate driver integrated circuit product 371 provides a control signal for high-power drive device 108 and gate driver integrated circuit product 331 provides a control signal for high-power drive device 109. Gate driver integrated circuit product 331 and gate driver integrated circuit product 371 include driver 358 and driver 398 respectively, which generate one or more corresponding output control signals based on corresponding received control signals CTL received from driver control circuit 354 and driver control circuit 394, respectively. Driver 358 generates corresponding output control signals based on at least one signal received across isolation barrier 348 from driver control circuit 354 in response to control signal HS and control signal FLT received from controller integrated circuit product 402 by driver control circuit 354 via terminals 334 and 336. In an exemplary embodiment, driver 358 turns on high-power drive device 109 by driving current through terminal 342, turns off high-power drive device 109 by sinking current to the reference node coupled to terminal 346 via terminal 344, or softly shuts down high-power drive device 109 by sinking current to the reference node coupled to terminal 346 via terminal 342, consistent with techniques described above. Driver 398 generates corresponding output control signals based on at least one signal received across isolation barrier 359 from driver control circuit 394 in response to control signal LS and control signal FT received from controller integrated circuit product via terminals 374 and 376. In an exemplary embodiment, driver 398 turns on high-power drive device 108 by driving current through terminal 382, turns off high-power drive device 108 by sinking current to the reference node coupled to terminal 386 via terminal 384, or softly shuts down high-power drive device 108 by sinking current to the reference node coupled to terminal 386 via terminal 382. In other embodiments of gate driver integrated circuit product 331 and gate driver integrated circuit product 371, other configurations of one or more terminals are used to turn on, turn off, and softly turn off high-power drive device 108 or high-power drive device 109.

In at least one embodiment of a gate driver system, undervoltage lockout detector 352 and undervoltage lockout detector 392 detect when VDD1 exceeds one or more under voltage lockout threshold levels predetermined voltages using terminals 332 and 372, respectively. The indicators generated by undervoltage lockout detector 352 and undervoltage lockout detector 392, are used to prevent driver control circuit 354 and driver control circuit 394 from communicating erroneous control information to driver 358 and driver 398, respectively. In at least one embodiment of a gate driver system, undervoltage lockout detector 356 and undervoltage lockout detector 396 detects when VDD2 exceeds an undervoltage lockout threshold level using terminals 340 and 380, respectively, and prevent application of insufficient voltages to the control terminals of high-power drive device 109 and high-power drive device 108, respectively, e.g., by forcing the output on terminal 342 and terminal 382, respectively, to have a low voltage during power-up of the gate driver system.

Fault detection integrated circuit product 301 is a separate product from gate driver integrated circuit product 331 and gate driver integrated circuit product 371. Fault detection integrated circuit product 301 includes fault detection circuitry 310, which communicates with fault reporting circuitry 304 across isolation barrier 328 using feedback communication across isolation barrier 328. Use of fault detection integrated circuit product 301 reduces the redundant fault detection circuitry that otherwise may be included in multiple instantiations of a gate driver integrated circuit product for driving an inverter including high-power drive device 108 and high-power drive device 109. For example, gate driver integrated circuit product 331 and gate driver integrated circuit product 371 do not include some or all of fault detection circuits and reporting circuits that are included in fault detection integrated circuit product 301.

In at least one embodiment, fault detection integrated circuit product 301 includes fault detection circuit 310 coupled to terminals 322, 324 and 326. In at least one embodiment, terminal 322 is configured to detect an over current fault, terminal 324 is configured to provide configuration information (e.g., a configurable fault threshold voltage based on a resistance of resistor $R_C$), and terminal 326 is coupled to a voltage reference node. In another embodiment, terminal 322 is configured to detect a desaturation fault and is coupled to at least an external resistor that is coupled to a drain terminal (or a collector terminal, as the case may be) of high-power drive device 109. Fault detection circuit 310 senses when $V_{CESAT}$ of high-power drive device 109 exceeds a predetermined threshold voltage (e.g., 7 V). Note that the predetermined threshold voltage of fault detection circuit 310 may be externally adjusted based on the forward voltage of one or more diodes coupled to a desaturation resistor coupled to terminal 322 and/or based on resistance the desaturation resistor (not shown). In addition, a delay time may be introduced by coupling a capacitor between terminal 322 and an external node (i.e., by including a blanking filter). In other embodiments, terminal 322 is configured to detect an over current fault and an additional terminal is included and coupled to an external resistor that is used to detect a desaturation fault. In other embodiments, terminal 322 is coupled to the drain (or collector as the case may be) of high-power drive device 108 and terminal 326 is coupled to a ground node.

In at least one embodiment of a fault detection integrated circuit product 301, undervoltage lockout detector 306 senses the supply voltage via terminal 320 and prevents fault detection circuit 310 from reporting erroneous fault information if VDD2 is insufficient to support proper operation of fault detection circuit 310 (e.g., by forcing no output of fault detection circuit 310 during power-up of the gate driver system). In at least one embodiment, undervoltage lockout detector 306 is configurable to lockout fault detection circuit 310 in response to a low driver supply voltage level, which may be determined according to a selectable threshold voltage level (e.g., 5 V, 8 V, 12 V, or 15 V) according to the target application. Undervoltage lockout detector 302 senses the primary-side supply voltage via terminal 312 and generates an indicator that prevents erroneous operation if VDD1 is insufficient to support proper operation (e.g., by causing fault reporting circuit 304 to report a fault condition during power-up of the gate driver system).

Fault detection circuit 310 communicates any fault information to fault reporting circuit 304 via feedback communications channel across isolation barrier 328. For example, fault detection circuit 310 implements a communications technique (e.g., digital modulation), as described above, that is fast enough (e.g., has a response time that is less than approximately 400 ns) to provide fault information to controller integrated circuit product 402, gate driver integrated circuit product 331, or gate driver integrated circuit product 371, and provide sufficient time for controller integrated circuit product 402, gate driver integrated circuit product 331, or gate driver integrated circuit product 371 to respond to the fault information.

In at least one embodiment, fault reporting circuit 304 includes a receiver compatible with a transmitter included in fault detection circuit 310. Fault reporting circuit 304 receives any fault information from fault detection circuit 310 and reports that fault information to controller integrated circuit product 402 via terminal 316. Fault reporting circuit 304 is configurable to store fault information until terminal 314 is toggled or otherwise enables fault reporting circuit 304. In an exemplary embodiment, terminal 316 is an open-drain, active low, pull-down terminal, although other implementations can be used. The active low implementation simplifies some embodiments of a gate driver system. For example, the active low implementation allows a logical-or of multiple fault reporting signals by coupling terminal 316 to other fault reporting signals that are generated in the gate driver system (e.g., generated by fault detection integrated circuit product 301 or generated by other fault detection integrated circuit products that are included in some embodiments of the gate driver system). In at least one embodiment, fault detection integrated circuit product 301 provides the fault information to gate driver integrated circuit product 331 and gate driver integrated circuit product 371 concurrently with providing the fault information to controller integrated circuit product 402. In at least one embodiment of a gate driver system, in response to receiving a fault indication from fault detection integrated circuit product 301, driver control 354 of gate driver integrated circuit product 331 or driver control 394 of gate driver integrated circuit product 371 initiates a shutdown or a soft shutdown of high-power drive device 109, or high-power drive device 108, respectively, consistent with techniques described above.

Figure 6:
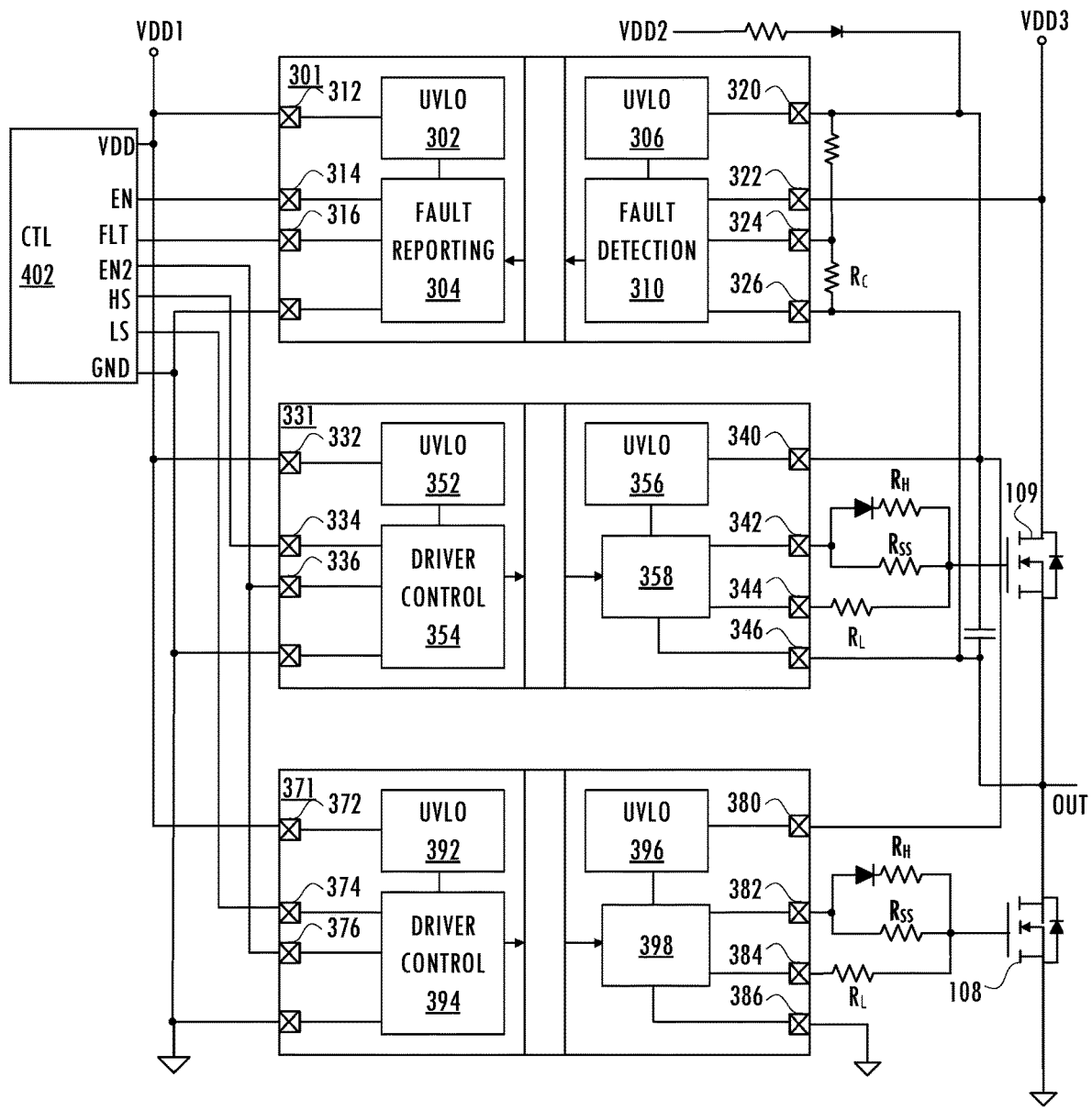
FIG. 6 illustrates a functional block diagram of a control system for driving high-power drive devices including a fault detection integrated circuit product and separate gate drive devices consistent with at least one embodiment of the invention.

Referring to FIG. 6, in another embodiment of a gate driver system, controller integrated circuit product 402 receives the fault information directly from fault detection integrated circuit product 301. Gate driver integrated circuit product 331 and gate driver integrated circuit product 371 do not receive the fault information directly from fault detection integrated circuit product 301. Controller integrated circuit product 402 determines how to react to any fault information and generates enable signal EN, enable signal EN2, high-side control signal HS, or low-side control signal LS based on the fault information. In at least one embodiment, controller integrated circuit product 402 is configured to sacrifice high-power drive device 108 or high-power drive device 109 to improve overall system safety. For example, in an automotive application, controller integrated circuit product 402 may allow high-power drive device 108 or high-power drive device 109 to continue operating for a period prior to shutting down high-power drive device 108 or high-power drive device 109 in response to detection of a fault. That delay allows the system sufficient time to safely stop a motor at the expense of damaging high-power drive device 108 or high-power drive device 109.

Figure 7:
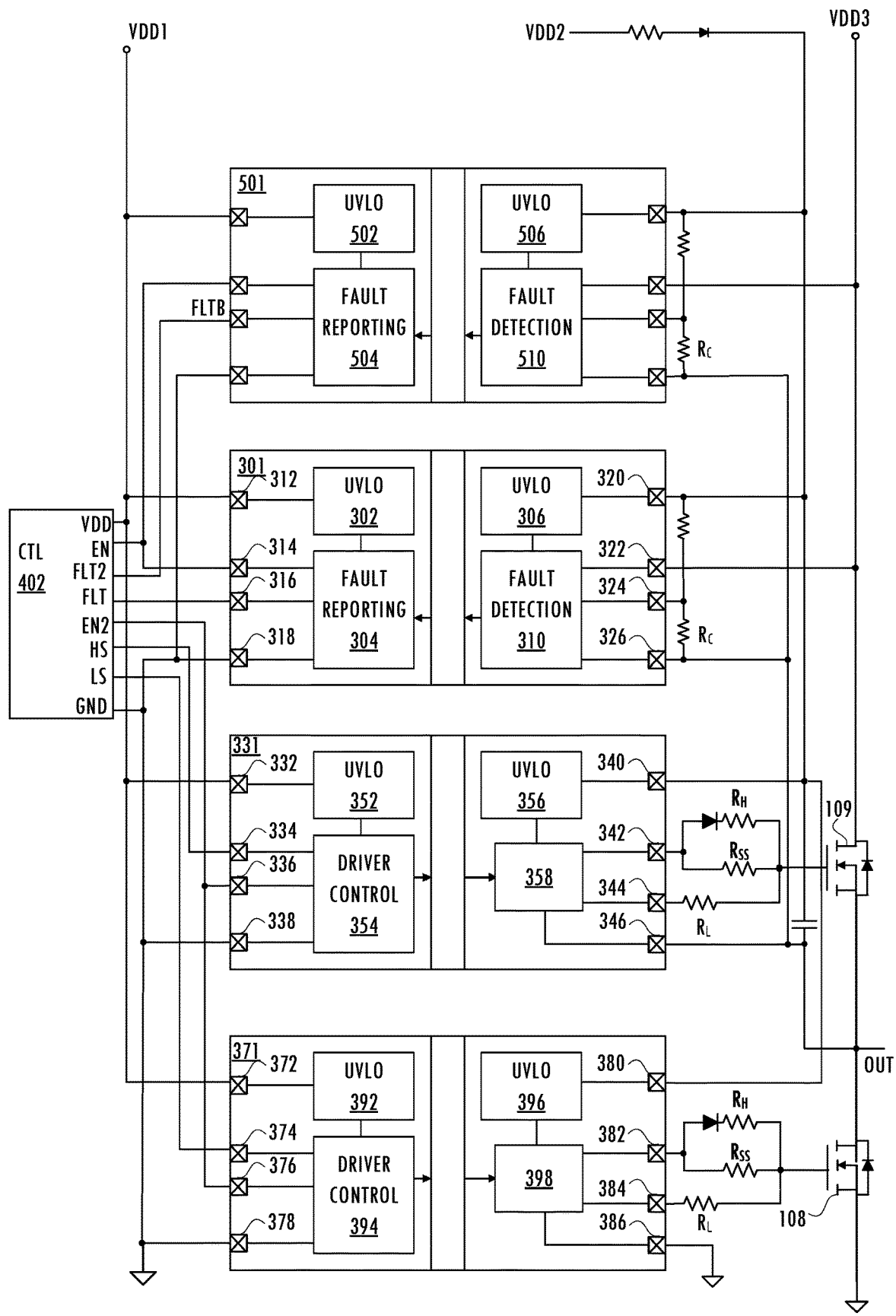
FIG. 7 illustrates a functional block diagram of a control system for driving high-power drive devices including multiple fault detection integrated circuit products consistent with at least one embodiment of the invention.

Referring to FIG. 7, in at least one embodiment of a gate driver system, fault reporting integrated circuit product 501 is included to provide redundant fault detection and reporting. If fault detection integrated circuit product 301 fails, fault reporting integrated circuit product 501 provides fault information directly to controller integrated circuit product 402. In other embodiments, fault reporting integrated circuit product 501 also provides fault information directly to gate driver integrated circuit product 331 or gate driver integrated circuit product 371. Undervoltage lockout detectors 502 and 506 operate similarly to undervoltage lockout detectors 302 and 306, respectively. In an exemplary embodiment of a gate driver system used in an ASIL application, a safety logic circuit includes fault detection integrated circuit product 301 or is separate from fault detection integrated circuit product 301. The safety logic circuit safety logic controller monitors voltage conditions associated with fault reporting integrated circuit product 301 as detected by undervoltage lockout detector 302 of FIG. 6 or fault reporting integrated circuit product 501 as detected by undervoltage lockout detector 502 of FIG. 7. The safety logic circuit determines whether VDD1 is sufficient to power controller integrated circuit product 402. If VDD1 is insufficient to power controller integrated circuit product 402, the safety logic controller takes control of the signals output by integrated circuit product 402 (e.g., EN1, EN2, HS, or LS) to safely shut down gate driver integrated circuit product 331 or gate driver integrated circuit product 371, when appropriate.

In some embodiments of a gate driver system, rather than providing redundant fault detection and reporting, fault detection circuit 510 and fault reporting circuit 504 of fault reporting integrated circuit product 501 are configured to detect and report a different fault than fault detection circuit 310 and fault reporting circuit 304 of fault reporting integrated circuit product 301. For example, fault detection integrated circuit product 301 is configured to detect whether a voltage on a drain terminal of 109 exceeds a first voltage and fault reporting integrated circuit product 501 is configured to detect whether a voltage on a drain terminal of 109 exceeds a second voltage that is different from the first voltage. In another embodiment, fault detection integrated circuit product 301 is configured to detect desaturation condition while fault reporting integrated circuit product 501 is configured to detect an over current condition. In at least one embodiment, at least one additional fault reporting device is included to detect overtemperature condition of gate driver integrated circuit product 331 or gate driver integrated circuit product 371.

Thus, flexible techniques for providing fault detection and fault reporting capability to a high-power system that addresses safety features and time-to-market for integrated circuit products have been described. The description of the invention set forth herein is illustrative and is not intended to limit the scope of the invention as set forth in the following claims. For example, while the invention has been described in embodiments in which fault detection and reporting are used in an AC motor application, one of skill in the art will appreciate that the teachings herein can be utilized in other applications (e.g., servo motor drive, solar and storage inverters, or power supply applications). Variations and modifications of the embodiments disclosed herein, may be made based on the description set forth herein, without departing from the scope of the invention as set forth in the following claims.

What is claimed is:

1. A system for controlling a high-power drive device, the system comprising:
    a fault detection integrated circuit product configured to provide an indication of a fault condition associated with the high-power drive device to a first terminal in a first voltage domain in response to detecting the fault condition in a second voltage domain;
    a redundant fault detection integrated circuit product configured to detect the fault condition in the second voltage domain and to provide a redundant indication of the fault condition to a redundant terminal in the first voltage domain; and
    a gate driver controller integrated circuit product configured to drive a second terminal coupled to a control node of the high-power drive device in the second voltage domain based on a control signal and an enable signal received from a third terminal in the first voltage domain, the second voltage domain being higher than the first voltage domain.

2. The system as recited in claim 1 wherein the fault detection integrated circuit product comprises:
    a fault detection circuit in the second voltage domain;
    a fault reporting circuit in the first voltage domain coupled to the first terminal; and
    a feedback channel configured to communicate fault information from the fault detection circuit across an isolation barrier to the fault reporting circuit.

3. The system as recited in claim 2 wherein the first terminal is an active low pull-down terminal.

4. The system as recited in claim 1 wherein the gate driver controller integrated circuit product comprises:
    a gate driver control circuit in the first voltage domain coupled to the third terminal and a control signal input terminal;
    a gate driver circuit in the second voltage domain coupled to the second terminal; and
    a communications channel configured to communicate control information across an isolation barrier from the gate driver control circuit to the gate driver circuit.

5. The system, as recited in claim 1 wherein the fault detection integrated circuit product comprises a controller integrated circuit product in the first voltage domain, the controller integrated circuit product generating the enable signal based on the indication of the fault condition or the redundant indication of the fault condition.

6. The system as recited in claim 1 further comprising an additional fault detection integrated circuit product configured to detect a second fault condition in the second voltage domain and to provide a second indication of the second fault condition to an additional terminal in the first voltage domain, the second fault condition being different from the fault condition.

7. The system as recited in claim 1 wherein the fault detection integrated circuit product is selectively configurable to detect faults associated with the high-power drive device.

8. The system as recited in claim 1 further comprising an additional gate driver controller integrated circuit product configured to drive a second node in the second voltage domain in response to the enable signal, the gate driver controller integrated circuit product being coupled to a high-side driver device, and the additional gate driver controller integrated circuit product being coupled to a low-side driver device.

9. A method for controlling a high-power drive device comprising:
    driving the high-power drive device using a communications channel across a first isolation barrier between a first voltage domain and a second voltage domain of a gate driver controller integrated circuit product; and
    detecting a fault in a configuration of the high-power drive device by a fault detection integrated circuit product;
    reporting the fault using a feedback communications channel across a second isolation barrier between the first voltage domain and the second voltage domain; and
    redundantly detecting the fault in the second voltage domain and providing a redundant indication of the fault to a redundant terminal in the first voltage domain.

10. The method as recited in claim 9 further comprising receiving an indication of the fault by the gate driver controller integrated circuit product and disabling the high-power drive device by the gate driver controller integrated circuit product in response to the indication.

11. The method as recited in claim 10 further comprising continuing to drive the high-power drive device in response to a fault condition.

12. The method as recited in claim 9 further comprising:
    measuring a voltage on a pin; and
    configuring a fault detection circuit of the fault detection integrated circuit product according to the voltage.

13. The method as recited in claim 9 further comprising:
    receiving, by a controller integrated circuit product, fault information from the fault detection integrated circuit product; and
    providing, by the controller integrated circuit product, a control signal based on the fault information to the gate driver controller integrated circuit product.

14. A method for controlling a high-power drive device comprising:
    driving the high-power drive device using a communications channel across a first isolation barrier between a first voltage domain and a second voltage domain of a gate driver controller integrated circuit product; and
    detecting a fault in a configuration of the high-power drive device by a fault detection integrated circuit product; and
    reporting the fault using a feedback communications channel across a second isolation barrier between the first voltage domain and the second voltage domain, the fault being reported to a controller integrated circuit product by the fault detection integrated circuit product simultaneously with reporting the fault to the gate driver controller integrated circuit product.

15. The method as recited in claim 14 further comprising redundantly detecting the fault in the second voltage domain and providing a redundant indication of the fault to a redundant terminal in the first voltage domain.

16. An apparatus for handling faults in a high-power driver application comprising:
   means for driving a high-power drive device using a communications channel across a first isolation barrier between a first voltage domain and a second voltage domain of a gate driver controller integrated circuit product based on a control signal;
   means for detecting a fault in a configuration of the high-power drive device and reporting the fault using a feedback communications channel across a second isolation barrier between the first voltage domain and the second voltage domain; and
   means for redundantly detecting the fault in the configuration of the high-power drive device and redundantly reporting the fault using a second feedback communications channel across a third isolation barrier between the first voltage domain and the second voltage domain.

17. The apparatus as recited in claim 16 further comprising means for generating the control signal in the first voltage domain for the high-power drive device in the second voltage domain based on the fault and a predetermined configuration.

18. An apparatus for handling faults in a high-power driver application comprising:
   means for driving a high-power drive device using a communications channel across a first isolation barrier between a first voltage domain and a second voltage domain of a gate driver controller integrated circuit product based on a control signal;
   means for detecting a fault in a configuration of the high-power drive device and reporting the fault using a feedback communications channel across a second isolation barrier between the first voltage domain and the second voltage domain; and
   means for detecting a second type of fault in the configuration of the high-power drive device and reporting the second type of fault using a second feedback communications channel across a third isolation barrier between the first voltage domain and the second voltage domain.

19. The apparatus as recited in claim 18 further comprising means for redundantly detecting the fault in the configuration of the high-power drive device and redundantly reporting the fault using a second feedback communications channel across a third isolation barrier between the first voltage domain and the second voltage domain.

* * * * *